Dec. 30, 1924.
C. C. FARMER
CENTRIFUGAL DIRT COLLECTOR
Filed Nov. 17, 1921
1,520,706
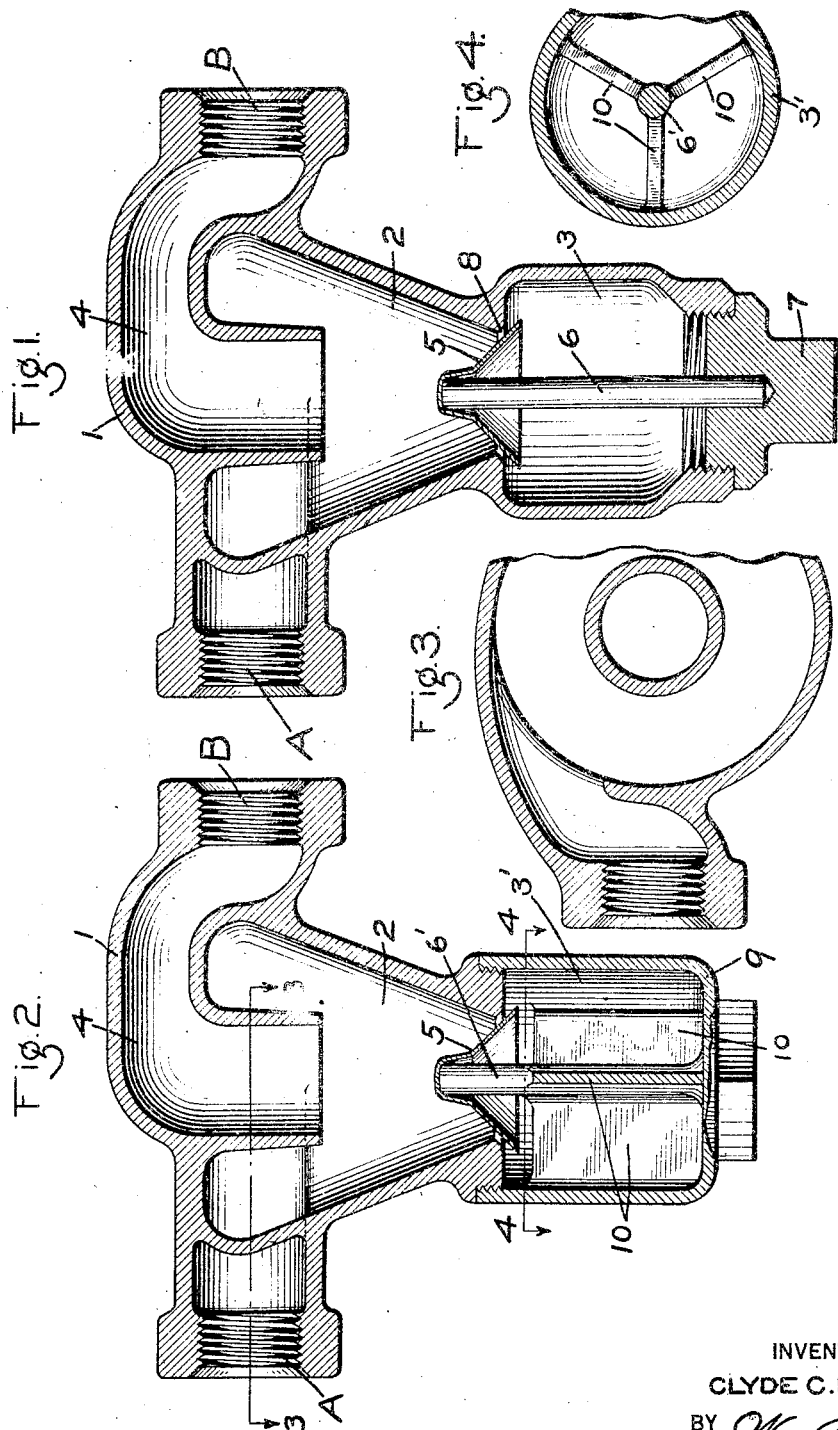
INVENTOR
CLYDE C. FARMER
BY Wm. W. Cady
ATTORNEY Patented Dec. 30, 1924.

1,520,706

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CENTRIFUGAL DIRT COLLECTOR.

Application filed November 17, 1921. Serial No. 515,923.

*To all whom it may concern:*

Be it known that I, CLYDE C. FARMER, a citizen of the United States, residing at Pittsburgh, in the county of Allegheny and State of Pennsylvania, have invented new and useful Improvements in Centrifugal Dirt Collectors, of which the following is a specification.

This invention relates to devices for separating dirt and dust from fluid under pressure flowing through a conduit, such as the well known fluid pressure brake and signal pipes employed in connection with fluid pressure brake systems on railway cars.

A construction of the above character is disclosed in Reissue Letters Patent of W. A. Derby, No. 12,414, dated December 5, 1905, and the present invention has for its object to provide an improved dust collector of the type shown in the above mentioned patent.

In the accompanying drawing, Fig. 1 is a central sectional view of a dust collector embodying one form of my invention; Fig. 2 a central sectional view of a dust collector embodying a slightly modified form of my invention; Fig. 3 a section on the line 3—3 of Fig. 2; and Fig. 4 a section on the line 4—4 of Fig. 2.

The dust collector shown in both Figs. 1 and 2 is of the centrifugal type as disclosed in the hereinbefore mentioned patent and comprises a casing 1 having an upper funnel shaped separating chamber 2 and a lower dust collecting chamber 3. The casing is interposed at the desired point in the fluid conducting pipe, such as the brake pipe of a fluid pressure brake system and is so disposed that fluid under pressure enters the casing at A and flows out at B, the inlet A being open to the chamber 2, as shown in Fig. 3. The outlet B is connected to the chamber 2 by a conduit 4 which extends downwardly into the chamber 2 at the central portion of the casing.

Fluid under pressure entering the dust collector at A passes to the chamber 2 and is directed into a spiral course by the inner wall of the chamber 2. Particles of dust or dirt in the current of air are deflected downwardly while the purified air passes out through the conduit 4 and the outlet B, the particles of foreign matter descending by gravity and finally falling into the collecting chamber 3.

It has been found that with a relatively large opening between the chambers 2 and 3, when the pressure in the fluid conducting pipe is reduced more or less rapidly, as often occurs in a fluid pressure brake pipe, the expansion of the dead air in the mass of particles collected at the bottom of the chamber 3, tends to cause the lifting of particles, so that more or less dust will pass back to the chamber 2 and then find its way into the fluid conducting pipe.

Furthermore, the large opening between the two chambers permits the swirling action of the current of air in chamber 2 to be connected to and taken up by the air in chamber 3, so that particles of foreign matter in chamber 3 are carried around with the air and by impinging on the inner wall of said chamber as well as one particle against another, the particles have a tendency to be ground up into a fine powder which still further increases the back dumping tendency when the pressure in the fluid conducting pipe is suddenly reduced.

According to my invention, a restricted though free opening is provided between the chambers 2 and 3, so that the body of air in chamber 2 does not have sufficient contact with the air in chamber 3 to permit the transmission of the swirling action of the current of air in chamber 2 to the air in chamber 3.

In order to prevent the sudden expansion of the air in chamber 3 and the consequent back dumping of dust particles in said chamber, when a sudden reduction in pressure in the fluid conducting pipe is made, I provide a check valve between the chambers 2 and 3, which preferably comprises a thin, light weight, cone shaped member 5. The member 5 is freely supported in position by a post 6, in the Fig. 1 form, said post being pressed into a hole formed in the threaded cap nut 7. The check valve 5 has a seat 8 formed in the adjacent portion of the casing and the check valve is so disposed that normally a restricted annular passage is provided between the chambers 2 and 3. The annular passage is so restricted that the swirling action of fluid in chamber 2 is not communicated to the air in chamber 3, while at the same time, a free passage is provided for particles of dust and dirt to pass from chamber 2 to chamber 3. The check valve member is free to rock on its support, so that an occasional particle, larger than would normally pass through the restricted passage, will, by its weight, cause a tilting of the check valve to one side, so that the particle will drop into the chamber 3.

Upon a sudden reduction in pressure in the fluid conducting pipe and in the chamber 2, the pressure of fluid in chamber 3 will move the check valve to its seat, so that back flow of air and dust particles from chamber 3 to chamber 2 and to the fluid conducting pipe will be prevented.

In the modified form shown in Fig. 2, the check valve supporting stem 6' is made integral with a removable cup member 9 having the dust collecting chamber 3' divided into compartments by integral baffle webs or plates 10, arranged as shown in Fig. 4. The purpose of the baffle plates 10 is to still further lessen any tendency to swirling of the contents of chamber 3', although the preferred construction shown in Fig. 1 without the baffle plates will satisfactorily accomplish the desired results in most cases.

Having now described my invention, what I claim as new and desire to secure by Letters Patent, is:—

1. In a dust collector, a casing having a dust separating chamber, a dust collecting chamber, a rigid post carried by the casing, and a check valve loosely mounted on said post for controlling communication from the collecting chamber to the separating chamber.

2. In a dust collector, a casing having a dust separating chamber, a dust collecting chamber, a rigid post carried by the casing, and a check valve loosely mounted on said post to normally provide open communication from the separating chamber to the collecting chamber and operated upon a reduction in pressure in the separating chamber for preventing back flow from the collecting chamber to the separating chamber.

3. In a dust collector, a casing comprising a section having a dust separating chamber, a section having a dust collecting chamber and removably secured to the first section, a rigid post carried by the casing section containing the dust collecting chamber, and a check valve mounted on said post for controlling communication between said chambers.

In testimony whereof I have hereunto set my hand.

CLYDE C. FARMER.